(12) United States Patent
Bansal et al.

(10) Patent No.: US 12,438,702 B2
(45) Date of Patent: Oct. 7, 2025

(54) SYSTEMS AND METHODS OF APPLICATION LAYER PACKET INSPECTION

(71) Applicant: Salesforce, Inc., San Francisco, CA (US)

(72) Inventors: Kaushal Bansal, Pleasanton, CA (US); Prabhat Singh, San Jose, CA (US); Alankar Sharma, Moorestown, NJ (US)

(73) Assignee: Salesforce, Inc., San Francisco, CA (US)

( * ) Notice: Subject to any disclaimer, the term of this patent is extended or adjusted under 35 U.S.C. 154(b) by 293 days.

(21) Appl. No.: 18/101,681

(22) Filed: Jan. 26, 2023

(65) Prior Publication Data

US 2024/0259186 A1 Aug. 1, 2024

(51) Int. Cl.
*H04L 9/08* (2006.01)
*H04L 9/32* (2006.01)

(52) U.S. Cl.
CPC .......... *H04L 9/0825* (2013.01); *H04L 9/3268* (2013.01)

(58) Field of Classification Search
CPC ............................. H04L 9/0825; H04L 9/3268
See application file for complete search history.

(56) References Cited

U.S. PATENT DOCUMENTS

| 9,577,932 | B2 | 2/2017 | Ravipati | |
|---|---|---|---|---|
| 10,250,562 | B1* | 4/2019 | Srinath | ............... H04L 63/0209 |
| 10,432,540 | B2 | 10/2019 | Sharma | |
| 10,810,233 | B2 | 10/2020 | Bansal | |
| 10,838,962 | B2 | 11/2020 | Bansal | |
| 11,140,087 | B2 | 10/2021 | Sharma | |
| 11,252,026 | B2 | 2/2022 | Sharma | |
| 11,552,802 | B2 | 1/2023 | Bansal | |
| 2010/0023755 | A1* | 1/2010 | Kotani | ................... H04L 9/006 713/155 |
| 2015/0023173 | A1 | 1/2015 | Sharma | |
| 2015/0229565 | A1 | 8/2015 | Ravipati | |
| 2017/0126572 | A1 | 5/2017 | Sharma | |
| 2018/0191506 | A1* | 7/2018 | Vilvovsky | ................. H04L 9/14 |
| 2019/0132199 | A1 | 5/2019 | Sharma | |
| 2019/0163786 | A1 | 5/2019 | Bansal | |
| 2019/0188313 | A1 | 6/2019 | Bansal | |
| 2020/0044975 | A1 | 2/2020 | Sharma | |

(Continued)

*Primary Examiner* — Hany S. Gadalla
(74) *Attorney, Agent, or Firm* — Butzel Long (57) ABSTRACT

Systems and methods are provided for requesting, at a service configured on a server, a public key infrastructure (PKI) generated certificate using a PKI agent, where the PKI agent stores a private key and the generated certificate in a key management service (KMS). An application layer security controller communicatively coupled to the server registers the service to enable the application layer to inspect packets. The PKI agent transmits version information for the certificates to the application layer security controller, and the PKI agent updates the certificates and keys in the KMS. The service and an application layer datapath component change the routing of packets using an overlay network and inspect at least one of the packets. The application layer datapath component decapsulates at least one packet by using the private keys and certificates retrieved from the KMS, and performs application inspection of the decapsulated packet.

14 Claims, 7 Drawing Sheets

(56) References Cited

U.S. PATENT DOCUMENTS

| | | |
|---|---|---|
| 2021/0073220 A1 | 3/2021 | Bansal |
| 2021/0234890 A1 | 7/2021 | Bansal |
| 2021/0241047 A1 | 8/2021 | Karanth |
| 2021/0241179 A1 | 8/2021 | Karanth |
| 2021/0263663 A1 | 8/2021 | Bansal |
| 2021/0328807 A1 | 10/2021 | Bansal |
| 2021/0360002 A1* | 11/2021 | Metel ................. G06F 21/85 |
| 2021/0367930 A1* | 11/2021 | Wang ................. H04L 9/3268 |
| 2021/0409388 A1* | 12/2021 | Batcher ............. H04L 49/3018 |
| 2022/0021622 A1 | 1/2022 | Sharma |
| 2022/0086193 A1 | 3/2022 | Nguyen |
| 2022/0210011 A1 | 6/2022 | Sharma |
| 2022/0239584 A1 | 7/2022 | Sharma |
| 2023/0007474 A1* | 1/2023 | Ni ..................... H04L 63/0272 |
| 2023/0208205 A1* | 6/2023 | Lim ....................... H04B 5/79 |
| | | 307/104 |
| 2023/0308424 A1* | 9/2023 | Nix ..................... H04L 9/085 |

* cited by examiner

SYSTEMS AND METHODS OF APPLICATION LAYER PACKET INSPECTION

BACKGROUND

Presently, application layer inspection is introduced into a network architecture using a machine-in-the-middle arrangement. The machine-in-the-middle is typically a Reverse Proxy/Load Balancer which performs transport layer security (TLS) and traffic inspection before forwarding traffic to a server providing an application. However, such arrangements add latency in providing a service by the application. Also, some legacy applications require code changes, as such applications typically have custom trust validations that are built between the backend servers and the existing Reverse Proxy/Load Balancers.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Use of in-line (i.e., in-band) inspection of application layer data packet traffic, such as with a Layer7 inspection in an Open Systems Interconnection (OSI) 7-layer model of a data communication system, may result in a performance drop to a service provided by one or more servers. Application layer inspection may sort traffic (i.e., data packets) according to which application or application service the traffic is attempting to reach, and what the specific contents of the data packet are.

In-line inspection of traffic may relate to inspection of the actual data packet in the main data path, rather than inspecting copies of data packets outside the main data path, which may occur with out-of-band inspection. As in-line inspection typically reduces the performance of providing a service by the server, out-of-band inspection is generally used for application layer inspection of traffic. For example, a datacenter and/or one or more servers providing a service may include Tap devices (test, terminal, or traffic access point devices) to collect and forward the data to an intrusion detection system (IDS) and/or an intrusion protection system (IPS) for further inspection of the data packets. IDS and/or IPS may monitor traffic on the network to identify known malicious behavior. IDS and/or IPS may identify the exploit attempts and block them before the attempts compromise any endpoints within the network.

Since the data is encrypted when sent to IDS and/or IPS, it is typically difficult to perform threat detection. That is, with an encrypted data, behavior analysis and/or pattern recognition may be performed, but deep inspection of a data packet is typically not available in this out-of-band arrangement.

Traditionally, application layer inspection has been performed using a machine-in-the-middle arrangement, where a Reverse Proxy and/or Load balancer is used to perform transport layer security (TLS) termination and traffic inspection before forwarding traffic to one or more servers (e.g., where one or more servers provide services of an application). TLS may be a proxy server that acts as an intermediary point between client and server applications, and is used to terminate and/or establish TLS (or DTLS) tunnels by decrypting and/or encrypting communications.

The machine-in-the-middle arrangement typically adds latency in providing a service, as the machine-in-the-middle performs application layer inspection. Some applications providing a service typically need code changes, as their custom trust validations may be between one or more backend servers and existing Load balancers and/or reverse proxies.

In implementations of the disclosed subject matter, application layer inspection may be performed in a transparent mode, where no application and/or system architecture changes are needed to the application side. That is, implementations of the disclosed subject matter improve upon current systems that perform application layer inspection, which typically require changes to the deployment architecture (e.g., using a machine-in-the-middle) and/or which require changes to the application code. Unlike current systems to perform application layer inspection, implementations of the disclosed subject matter do not use TLS termination (i.e., machine-in-the-middle) between a client and a server to support end-to-end trust. Rather, the service may communicate with a PKI controller (i.e., a public key infrastructure controller) and KMS controller (i.e., a Key Management System controller), respectively, to retrieve private keys and certificates to enable decapsulation, decryption, and application layer inspection of packets with a security inspection zone that includes a security controller that is communicatively coupled to the services, the PKI controller, and the KMS controller.

In some implementations, the application layer inspection may be performed out-of-band without adding any extra latency to the system. In other implementations, application layer inspection may be performed in-band. Although this may increase latency versus the out-of-band implementation, the in-band inspection of the disclosed subject matter improves upon current systems, as no application or architecture changes are needed Implementations of the disclosed subject matter may be used to address performing application layer inspection of traffic for services that are customers (i.e., which may be referred to as a North-South traffic pattern) and/or for another service (i.e., which may be referred to as an East-West traffic pattern) without architecture changes or code changes, which may be necessary in current systems.

Figure 1:
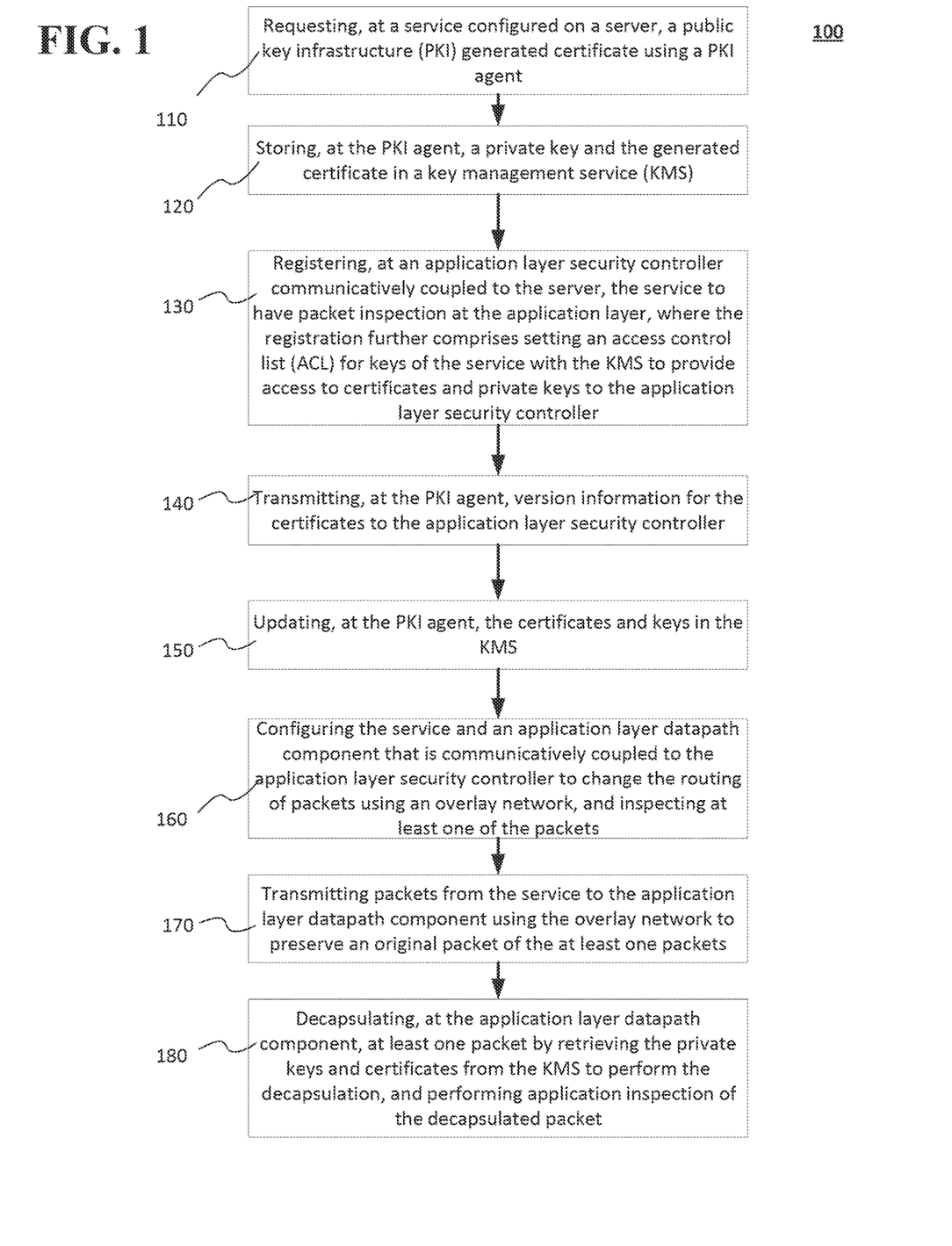
FIGS. 1-2 show an example method of application layer packet inspection according to an implementation of the disclosed subject matter.

FIG. 1 shows an example method 100 of application layer packet inspection according to an implementation of the disclosed subject matter. At operation 110, a service (e.g., service 310, 320, and/or 330 shown in FIG. 3) configured on a server (e.g., server 700 shown in FIG. 7) may request a public key infrastructure (PKI) generated certificate using a PKI agent (e.g., PKI agent 317 shown in FIG. 4).

In cryptography and as used throughout, a key may be a piece of information, such as a string of numbers or letters. The key may be processed through a cryptographic algorithm to encode or decode cryptographic data. In a network or database that has multiple tenants, keys typically have a single owner, but access policies may specify the control the use of a key by other tenants. Access to keys may be provided using Access Control Policies (ACLs). When a key is created, a key type may be specified which determines whether the key is used for symmetric or asymmetric cryptographic operations. To decrypt data or verify a signature, the same key version that was used to encrypt or sign the data may be used. A key version may be retired (i.e., disabled) or deleted (i.e., destroyed) without affecting other versions Rotating a key may create a new version of a key. A key version may be selectively disabled without affecting other key versions. Each Key Management System (KMS) key may be owned by a specified tenant, where the party initiating the request for the key creation specifies the tenant it should belong to. The creator of the key may specify ACLs to restrict access to the key.

In operation 110, the PKI agent (e.g., PKI agent 317) may obtain the certificate from a PKI controller (e.g., PKI controller 800 shown in FIGS. 3 and 6) The PKI controller may be a server or other computing device to generate and/or manage certificates. Public key infrastructure (PKI), which may include the PKI controller and/or the PKI agent, may be a set of roles, policies, hardware, software, and/or procedures to create, manage, distribute, use, store and/or revoke digital certificates and manage public-key encryption. The PKI controller and/or PKI agent may be used to facilitate the secure electronic transfer of information for one or more network activities. For example, PKI certificates may be used for activities where passwords may be an inadequate authentication method, and more rigorous proof may be used to confirm the identity of one or more parties (e.g., the identity of a tenant) in the communication and to validate the information being transferred. The PKI controller may be a centralized certificate that issues certificates. For example, the PKI controller may issue a certificate as requested by the PKI agent in operation 110.

The PKI agent (e.g., PKI agent 317 shown in FIG. 4) may be part of the service (e.g., service 310 shown in FIGS. 3-4) The service may be provided by a server (e.g., server 700), and the PKI agent may be part of the server. The PKI age may request and/or rotate the certificates for the same. This is the PKI agent which interacts with the PKI Controller.

Figure 3:
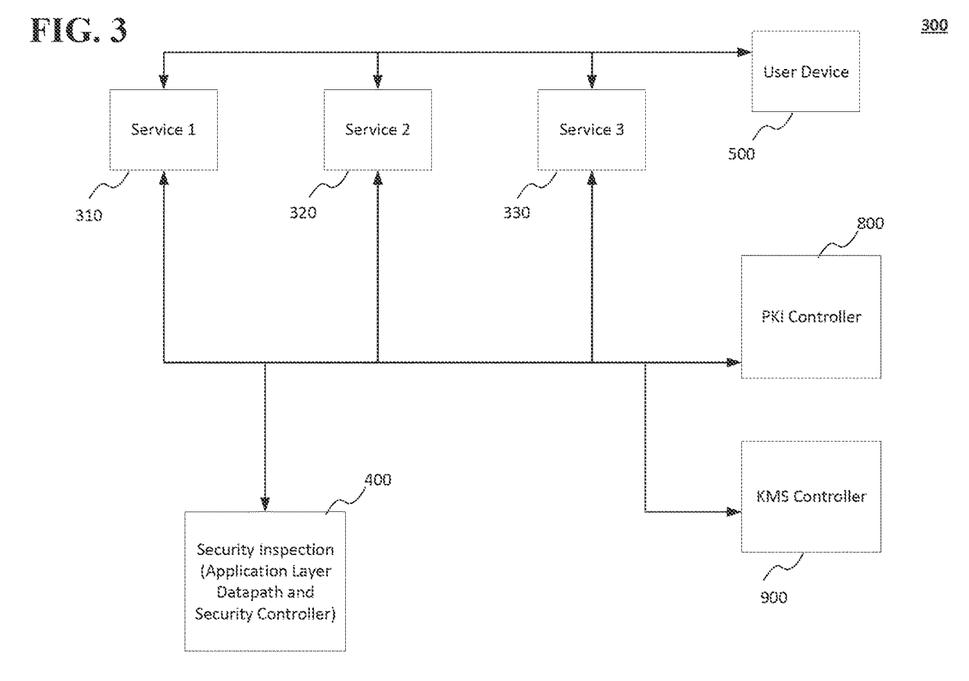
FIGS. 3-6 shows an example system to perform application layer packet inspection of FIGS. 1-2 according to an implementation of the disclosed subject matter.
Figure 6:
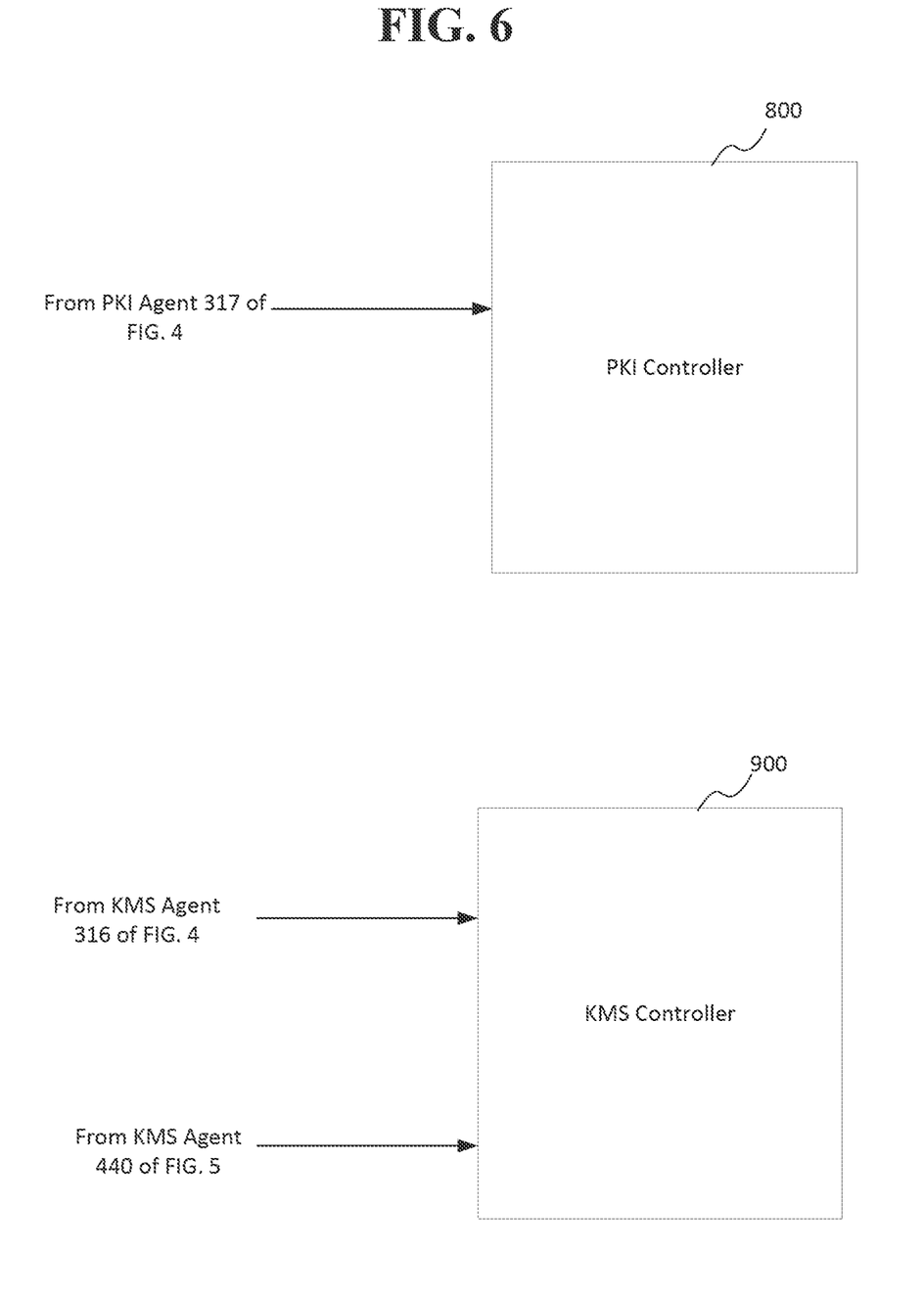

At operation 120, the PKI agent may store a private key and the generated certificate in a key management service (KMS) controller (e.g., KMS controller 900 as shown in FIGS. 3 and 6). That is, the PKI agent of the service may transmit the private key and certificate to the KMS for storage. In some implementations, access to the private key and the certificate may be to the service which requested the certificate (e.g., service 310 shown in FIGS. 3-4), and access may be denied to the private key and certificates for requests made by other services (e.g., service 320 and/or service 330 shown in FIG. 3).

The KMS controller that stores the private key and the generated certificate may be a server and/or other computing device. That is, the KMS controller may be hardware and/or software that may be a centralized cryptographic key management service which may provide capabilities to one or more tenants to store and/or retrieve cryptographic keys. The keys may be shared with the ACLs that are in place (i.e., in force) among different tenants.

At operation 130, the service may be enabled for inspection of data packets at the application layer by being registered at application layer security controller (e.g., application layer security controller 430 shown in FIG. 5) communicatively coupled to the server. The registration may include setting an access control list (ACL) for keys of the service (e.g., service 310 shown in FIG. 4) with the KMS (e.g., KMS controller 900 shown in FIGS. 3 and 6) to provide access to certificates and private keys to the application layer security controller (e.g., application layer security controller 430). The application layer security controller (e.g., application layer security controller 430 shown in FIG. 5) may be part of security inspection 400 shown in FIGS. 3 and 5, which may be hardware, software, or a combination thereof. In some implementations, the service (e.g., service 310) may select and/or receive a selection (e.g., from the user device 500 shown in FIGS. 3 and 7) to have application layer inspection be performed out-of-band, and the service may be registered at the application layer security controller (e.g., application layer security controller 430 shown in FIG. 5 of the security inspection 400). During the registration, the service may program and/or adjust the ACLs for the keys of the service with the KMS controller (e.g., KMS controller 900) to provide the application layer security controller access to certificates and private keys. That is, the service (e.g., service 310 shown in FIGS. 3-4) may use the KMS agent (e.g., KMS agent shown in FIG. 4) to communicate with the KMS controller (e.g., KMS controller 900 shown in FIGS. 3 and 6) to program and/or adjust the ACLs. In some implementations, version information of the certificates may be transmitted from the PKI agent to the application layer security controller when the certificates are rotated. The PKI agent may also update the certificates and keys with the KMS controller.

Figure 4:
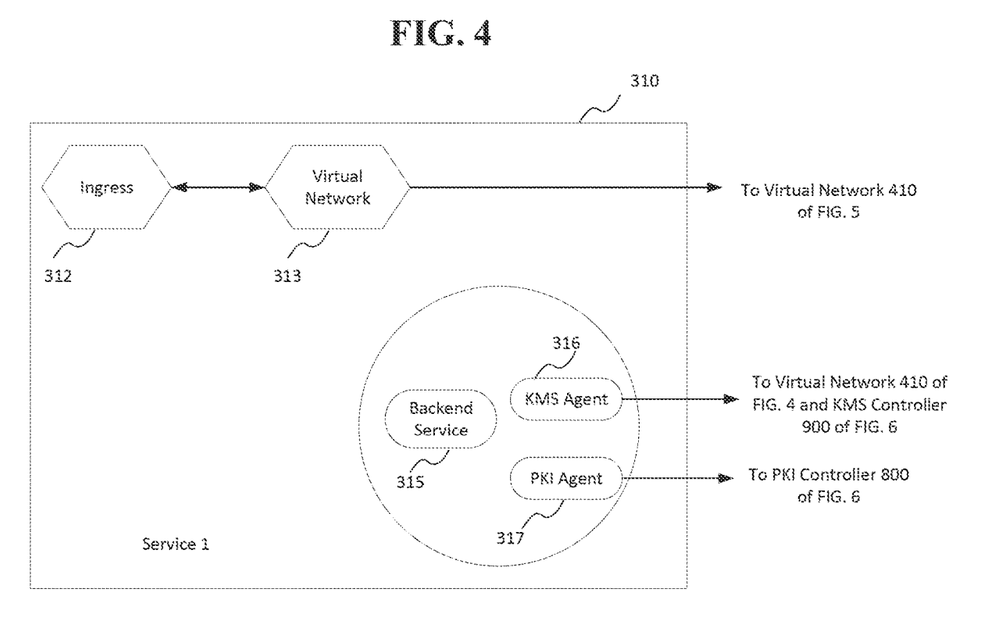
Figure 5:
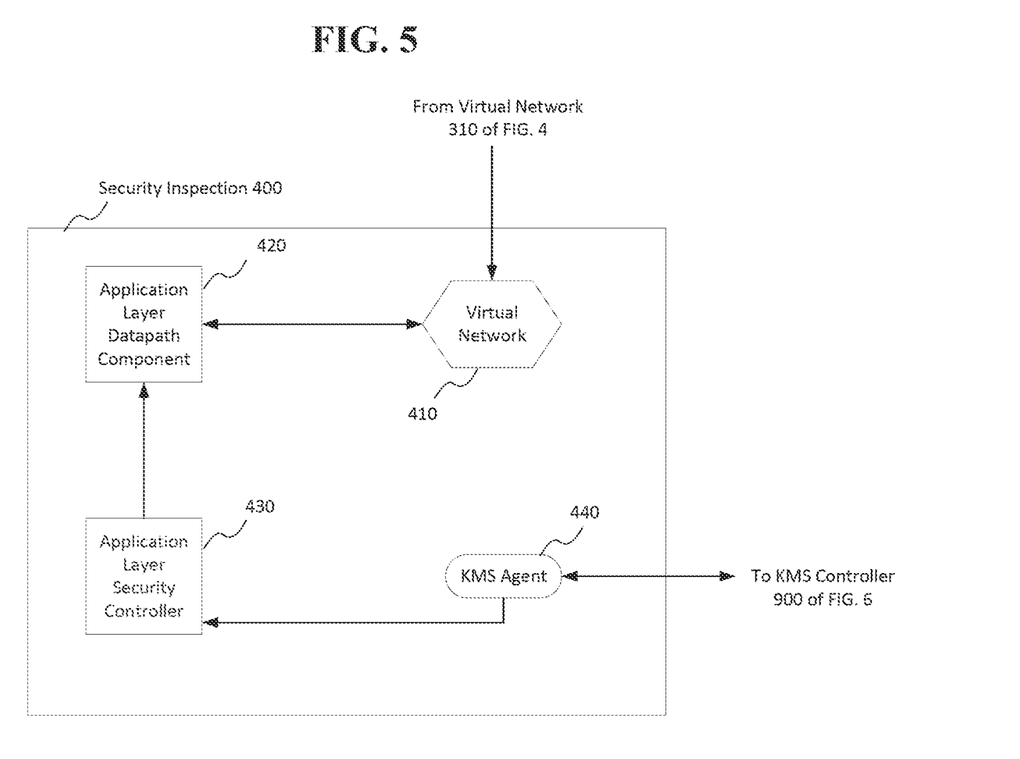

At operation 140 the PKI agent of the service (e.g., PKI agent 317 of service 310 shown in FIG. 4) may transmit version information for the certificates to the application layer security controller (e.g., application layer security controller 430 of security inspection 400 shown in FIG. 5). At operation 150, the PKI agent of the service (e.g., PKI agent 317 of service 310 shown in FIG. 4) may update the certificates and keys in the KMS (e.g., KMS controller 900 shown in FIG. 6). In some implementations, the version information may be transmitted by the PKI agent when the certificates are rotated.

At operation 160, the service (e.g., service 310 shown in FIGS. 3-4) and an application layer datapath component (e.g., application layer datapath component 420 of security inspection 400 shown in FIG. 5) that is communicatively coupled to the application layer security controller (e.g., application layer security controller 420 of security inspection 400 shown in FIG. 5) may be configured to change the routing of packets using an overlay network (e.g., virtual network 410 shown in FIG. 5) and to inspect at least one of the packets.

At operation 170, the service (e.g., service 310 shown in FIGS. 3-4) may transmit packets to the application layer datapath component (e.g., application layer datapath component 420 shown in FIG. 5) using the overlay network (e.g., virtual network 313 shown in FIG. 4) to preserve an original packet of the at least one packets to be inspected. The overlay network may be based on software to create layers of network abstraction that can be used to run multiple separate, discrete virtualized network layers (e.g., virtual network 313 shown in FIG. 4 and/or virtual network 410 shown in FIG. 5) on top of the physical network.

At operation 180, the application layer datapath component (e.g., application layer datapath component 420 shown in FIG. 5) may decapsulate at least one packet by retrieving the private keys and certificates from the KMS (e.g., KMS controller 900 shown in FIG. 6) to perform the decapsulation, and may perform application inspection of the decapsulated packet. That is, as the application layer datapath component has access to the private key and certificates (e.g., via the KMS agent 440 shown in FIG. 5), it may decrypt data packets of the traffic, and may perform application inspection for the decrypted packet. For example, the decryption and data packet inspection may be performed in an out-of-band fashion.

Figure 2:
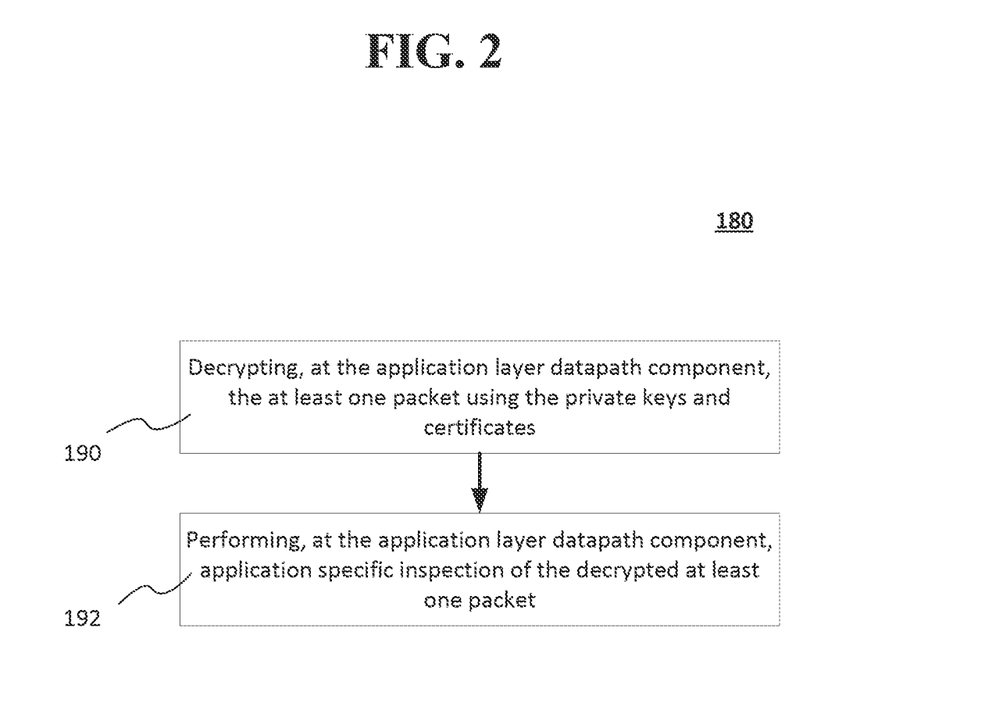

Additional operations of operation 180 of method 100 are shown in FIG. 2. At operation 190, the application layer datapath component (e.g., application layer datapath component 420 shown in FIG. 5) may decrypt the at least one packet using the private keys and certificates that may be obtained from the KMS controller 900 using the KMS agent 440 as shown in FIGS. 3, 5, and 6. At operation 192, the application layer datapath component may perform an application specific inspection of the decrypted at least one packet. This application specific inspection of the at least one packet may be performed out-of-band.

In some implementations, the service (e.g., service 310 shown in FIGS. 3-4) may determine whether to enable application layer inspection of packets in-band. The service may decrypt the at least one packet using the private keys and certificates and may perform application specific inspection of the decrypted at least one packet in-band based on the determination. The in-band inspection of packets may reduce the performance of the service in comparison to the out-of-band inspection of packets described above.

The in-band and out-of-band implementations of the disclosed subject matter improve upon current systems to perform application layer inspection, which typically require changes to the deployment architecture (e.g., using a machine-in-the-middle) and/or which require changes to the application code. Unlike current systems to perform application layer inspection, implementations of the disclosed subject matter do not use TLS termination (i.e., machine-in-the-middle) between a client and a server to support end-to-end trust. Rather, PKI agents and KMS agents of the service may communicate with a PKI controller and KMS controller, respectively, to retrieve private keys and certificates to enable decapsulation, decryption, and application layer inspection of packets.

FIGS. 3-6 shows an example system 300 to perform application layer packet inspection of FIGS. 1-2 according to an implementation of the disclosed subject matter. The system 300 and/or portions of system 300 may be part of a public cloud system, a public and/or private network, or the like. System 300 of FIG. 3 shows service 310, service 320, and service 330. Although only three services (e.g., service 310, service 320, and service 330) are shown, there may be any suitable number of services. One or more of the services may be provided by at least one server, such as by server 700 shown in FIG. 7.

FIG. 4 shows example components of service 310 according to an implementation of the disclosed subject matter. Service 320 and/or service 330 may have similar components to service 310. Ingress 312 may be a public endpoint for the service 310 that may be accessible to an end user (e.g., computer 500 shown in FIG. 7 and described below that may be used by an end user). Ingress 312 may be communicatively coupled with the virtual network 313, which may provide communication between the service 310 and the security inspection 400 shown in FIG. 5.

The virtual network 313 may be part of the overlay network that may be used by the service 310 to transmit packets to the application layer datapath component 420 of the security inspection 400 shown in FIG. 5, where the virtual network 410 of the security inspection 400 receives the transmitted packets.

Service 310 may include backend service 315, KMS agent, and PKI agent 317. The backend service 315 may be used to control the KMS agent 316 and/or or the PKI agent 317. For example, the backend service 315 may request that the PKI agent 317 obtain a certificate from the PKI controller 800, control the KMS agent 317 to store and/or retrieve private keys and the certificate from the KMS controller, or the like. The KMS agent 316 may communicate with the virtual network 410 of the security inspection 400 shown in FIG. 4 and/or the KMS controller 900 shown in FIG. 6. In some implementations, the KMS agent 316 may be client software which abstracts authentication (authN) and/or authorization (AuthZ), and/or connectivity. The KMS agent 316 may be similar to a live client which refreshes keys at a certain location in the file system (e.g., the KMS controller 900 of FIG. 6 which may be part of server 700 shown in FIG. 7). For example, the KMS agent 316 may request private keys and a certificate from the KMS controller 900. The PKI agent 317 may communicate with the PKI controller 800 of FIG. 6. For example, the PKI agent 317 may request a certificate from the PKI controller 800 as described above in connection with FIG. 1. The PKI controller 800 shown in FIGS. 3 and 6 may generate the certificate and provide it to the PKI agent 317 that made the request.

FIG. 3 shows security inspection 400 that is communicatively coupled to the service 310, service 320, service 330, PKI controller 800 and KMS controller 900 according to an implementation of the disclosed subject matter. FIG. 5 shows a detailed view of security inspection 400 that may include virtual network 410, application layer datapath component 420, application layer security controller 430, and KMS agent 440. The security inspection 400 and the aforementioned components thereof may be hardware (e.g., a server or other computer hardware devices), software, or a combination thereof. The virtual network 410 may be part of the overlay network receive packets and forward them to the application layer datapath component 420 from the service 310. The application layer datapath component 420 may be configured to change the routing of packets using the virtual network 410 (i.e., the overlay network) and to inspect at least one of the packets. The application layer security controller 430 may have access to certificates and private keys of a service (e.g., service 310) to enable data packet inspection. The KMS agent 440 may be communicatively coupled to the KMS controller 900 shown in FIGS. 3 and 6. The KMS agent 440 may retrieve the private keys and certificates from the KMS controller 900 shown in FIGS. 3 and 6, which may be used to decapsulate a packet so that application inspection may be performed.

Figure 7:
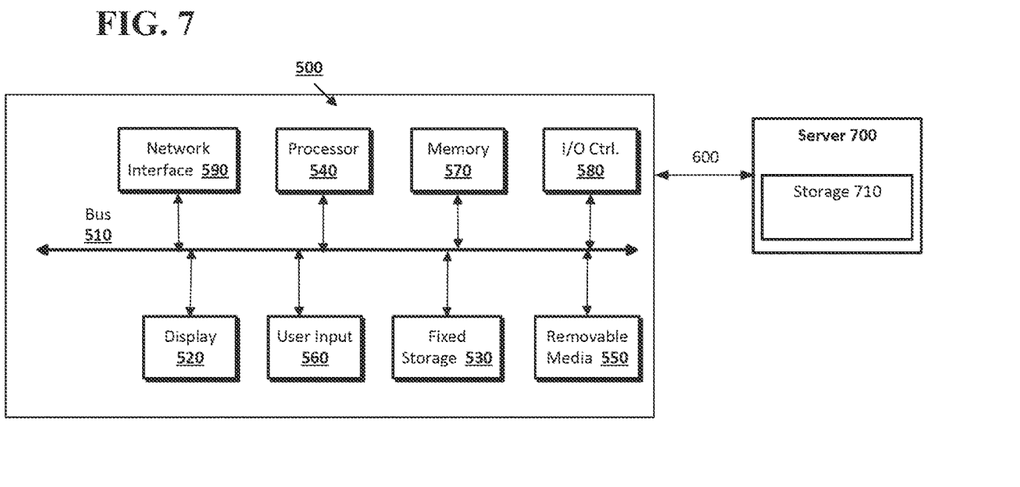
FIG. 7 shows a computer system according to an implementation of the disclosed subject matter.

User device 500 of FIG. 3 may be communicatively coupled to and may issue requests to service 310, service 320, and/or service 330. For example, an application being executed by the user device may issue requests to one or more of the services. User device 500 is also shown in FIG. 7 and described in detail below.

Implementations of the presently disclosed subject matter may be implemented in and used with a variety of component and network architectures. FIG. 7 is an example computer 500 suitable for the implementations of the presently disclosed subject matter. As discussed in further detail herein, the computer 500 may be a single computer in a network of multiple computers. In some implementations, the computer 500 may be used to execute one or more applications that may request data and/or processing from one or more services (e.g., service 310, service 320, and/or service 330 shown in FIG. 3). As shown in FIG. 7, the computer 500 may communicate with a server 700 (e.g., a server, cloud server, database, cluster, application server, neural network system, or the like) via a wired and/or wireless communications network 600. The server 700 may include a storage device 710, and/or may be communicatively coupled to a storage device. Although one server is shown in FIG. 7, there may be a plurality of servers that may be used in, for example, the system 300 shown in FIG. 3. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The storage 710 may store data, such as private keys, certificates, tenant data, and the like.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "requesting", "storing", "registering", "transmitting", "updating", "configuring", "transmitting", "decapsulating", "decrypting", "performing", determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   requesting, at a service configured on a server, a public key infrastructure (PKI) generated certificate using a PKI agent;
   storing, at the PKI agent, a private key and the generated certificate in a key management service (KMS);
   registering, at an application layer security controller communicatively coupled to the server, the service to have packet inspection at the application layer, wherein the registration further comprises setting an access control list (ACL) for keys of the service with the KMS to provide access to certificates and private keys to the application layer security controller;
   transmitting, at the PKI agent, version information for the certificates to the application layer security controller;
   updating, at the PKI agent, the certificates and keys in the KMS;
   configuring the service and an application layer datapath component that is communicatively coupled to the application layer security controller to change the routing of packets using an overlay network, and inspecting at least one of the packets;
   transmitting the one or more routed packets from the service to the application layer datapath component using the overlay network to preserve an original packet of the one or more packets; and
   decapsulating, at the application layer datapath component, at least one routed packet of the one or more routed packets by retrieving the private keys and certificates from the KMS to perform the decapsulation, and performing application inspection of the decapsulated at least one routed packet of the one or more routed packets.

2. The method of claim 1, wherein the storing the private key and the certificate comprises:
   providing access to the private key and the certificate to the service which requested the certificate, and denying access to other services.

3. The method of claim 1, wherein the version information is transmitted when the certificates are rotated.

4. The method of claim 1, further comprising:
   decrypting, at the application layer datapath component, the at least one routed packet using the private keys and certificates.

5. The method of claim 4, further comprising:
   performing, at the application layer datapath component, application specific inspection of the decrypted at least one routed packet.

6. The method of claim 5, wherein the application specific inspection of the at least one routed packet is performed out-of-band.

7. The method of claim 1, further comprising:
   determining, at the service of the server, whether to enable application layer inspection of the at least one routed packet in-band, wherein the decrypting the at least one routed packet using the private keys and certificates and performing application specific inspection of the decrypted at least one routed packet is performed in-band based on the determination.

8. A system comprising:
   a server comprising at least one hardware processor configured with a service that requests a public key infrastructure (PKI) generated certificate using a PKI agent, wherein the PKI agent is configured to store a private key and the generated certificate in a key management service (KMS); and
   an application layer security controller communicatively coupled to the server to register the service to have packet inspection at the application layer, wherein the registration further comprises setting an access control list (ACL) for keys of the service with the KMS to provide access to certificates and private keys to the application layer security controller,
   wherein the PKI agent transmits version information for the certificates to the application layer security controller,
   wherein the PKI agent updates the certificates and keys in the KMS,
   wherein the service and an application layer datapath component that is communicatively coupled to the application layer security controller are configured to change the routing of one or more packets using an overlay network and inspect at least one of the one or more routed packets;
   wherein the service is configured to transmit the one or more routed packets to the application layer datapath component using the overlay network to preserve an original packet of the one or more packets; and
   wherein the application layer datapath component is configured to decapsulate at least one routed packet of the one or more routed packets by retrieving the private keys and certificates from the KMS to perform the decapsulation, and performing application inspection of the decapsulated at least one routed packet.

9. The system of claim 8, wherein the PKI agent stores the private key and the certificate by providing access to the private key and the certificate to the service which requested the certificate, and denying access to other services.

10. The system of claim 8, wherein the version information is transmitted when the certificates are rotated.

11. The system of claim 8, wherein the application layer datapath component decrypts the at least one routed packet using the private keys and certificates.

12. The system of claim 11, wherein the application layer datapath component performs an application specific inspection of the decrypted at least one routed packet.

13. The system of claim 12, wherein the application specific inspection of the at least one routed packet is performed out-of-band.

14. The system of claim 8, wherein the service determines to enable application layer inspection of packets in-band, and wherein the decrypting the at least one routed packet using the private keys and certificates and performing application specific inspection of the decrypted at least one routed packet is performed in-band based on the determination.

* * * * *